United States Patent Office 2,850,538
Patented Sept. 2, 1958

2,850,538
PREPARATION OF SYNTHETIC GLYCOLS FROM CONJUGATED ALIPHATIC DIOLEFINS

John F. Nobis and Edwin A. Allgeier, Cincinnati, Ohio, assignors to National Distillers and Chemical Corporation, a corporation of Virginia No Drawing. Application December 16, 1953
Serial No. 398,618

15 Claims. (Cl. 260—635)

This invention relates broadly to a novel method for the production of glycols, and more particularly, to the production of aliphatic glycols from conjugated diolefins, selected alkali metals, and epoxide compounds to yield the salts of the glycols from which the free glycols are obtained.

It is an object of this invention to provide a novel and effective method for the synthesis of aliphatic glycols utilizing relatively cheap and readily available raw materials.

It is another object of this invention to react aliphatic conjugated diolefins selectively with an alkali metal such as sodium or potassium in dispersed form to obtain the dimetallo derivatives of dimerized dienes having twice the number of carbon atoms of the starting diolefins and then react this product with an epoxide compound to form the salts of the aliphatic glycols which can readily be hydrolyzed to give the corresponding free glycols.

It is also a more particular object of this invention to selectively dimerize 1,3-butadiene using finely dispersed sodium and in the presence of an ether reaction medium to obtain disodiooctadienes and thereafter react these products with ethylene oxide, propylene oxide, or other epoxides and obtain glycols and sodium salts thereof.

Another object is to provide a novel and practical method for producing in good yields and purity a number of heretofore unknown glycols including 3-ethyl-1,10-decanediol and 3,6-diethyl-1,8-octanediol, which are prepared by the reaction of disodiooctadiene and ethylene oxide, and 4,7-diethyl-2,9-decanediol, 4-ethyl-2,11-dodecanediol and 2,13-tetradecanediol which are prepared by the reaction of disodiooctadiene and propylene oxide.

Other objectives of the invention will become apparent from the detailed description set forth below.

The present invention is carried out by initially treating an aliphatic conjugated diolefin with finely dispersed sodium or potassium in selected liquid ether medium and, if desired, in the presence of a relatively small amount of a polycyclic aromatic hydrocarbon and/or in the presence of a selected solid, friable attrition agent at controlled temperatures. The product obtained from this reaction is then treated with a compound of the epoxide type under selective reaction conditions to yield ultimately glycol products.

The initial step is a reaction which yields a dimerized product of the starting diolefin. For example, in the case where the initial reactants are sodium and butadiene, the dimeric product comprises the disodium derivatives of the aliphatic octadienes. A study of the structures indicates that this particular selective dimerization can yield the following products:

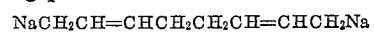

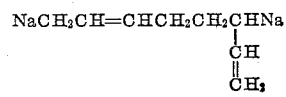

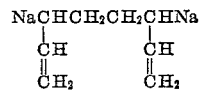

Accordingly, after the foregoing mixture of products has been reacted with, for example, ethylene oxide, the major primary products obtained are the following unsaturated glycols:

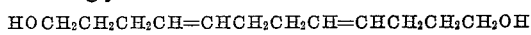

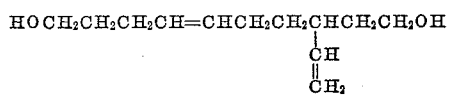

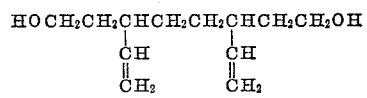

If the reactants used are other diolefins and other epoxide compounds then the glycol products accordingly corresponding to such structures are likewise obtained.

The generalized formula for these products is as follows:

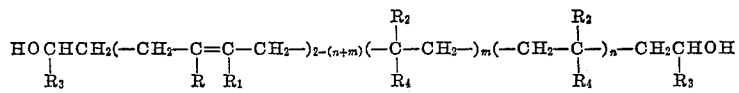

In the above formula, the letters $n$ and $m$ may represent either 0 or 1; $R$, $R_1$, $R_2$, and $R_3$ represent either an alkyl, aryl, aralkyl, or alkaryl group or a hydrogen atom, and $R_4$ represents an alkenyl group.

The diolefins which are useful for this improved process include any aliphatic conjugated diolefin such as, for example, butadiene, isoprene, dimethylbutadiene, the pentadienes such as the methyl-1,3-pentadiene, and the like. In general, it is desirable to use the conjugated aliphatic diolefins having from 4 to 8, inclusive, carbon atoms. Diolefins having more than about eight carbon atoms yield final glycol products containing relatively large numbers of isomeric glycols, and such mixtures give increasing separation difficulties. Butadiene is particularly suited for use as the diolefin reactant.

Either sodium or potassium can be used as the alkali metal reactant. Sodium is preferred over potassium since it has been found that sodium gives excellent selectivity and yields of dimerized products, and it is cheaper and more readily available. Mixtures containing a major proportion of sodium are also useful.

One factor in the successful production of the initial dimerized derivatives with which the epoxide compounds are reacted, is the use of the alkali metal in dispersed form. If bulk sodium is used instead of dispersed sodium, it either yields no product or results largely in the formation of highly condensed polymers from the diolefin. These unwanted polymers can be substantially avoided by employing the alkali metal as a dispersion. Such dispersions are most conveniently made in an inert hydrocarbon or ether preliminary to reaction with the selected diene.

The reaction medium most suitable for reaction of the diolefin with the alkali metal has been found to consist essentially of certain types of ethers. The ether medium can be any aliphatic mono ether having a methoxy group, in which the ratio of the number of oxygen atoms to the number of carbon atoms is not less than 1:4. Examples include dimethyl ether, methyl ethyl ether, methyl n-propyl ether, methyl isopropyl ether, and mixtures of these methyl ethers. Certain aliphatic polyethers are also satisfactory. These include the acyclic and cyclic polyethers which are derived by replacing all of the hydroxyl hydrogen atoms of the appropriate polyhydric alcohol by alkyl groups. Examples are the ethylene glycol dialkyl ethers such as the dimethyl, methyl ethyl, diethyl, methyl butyl, ethyl butyl, dibutyl, and butyl lauryl ethylene glycol ethers; trimethylene glycol dimethyl ether, glycerol trimethyl ether, glycerol dimethyl ethyl ether and the like. Generally, simple methyl monoethers such as dimethyl ether and the polyethers of ethylene glycols, such as ethylene glycol dimethyl ether are preferred. Hydrocarbon solvents such as isooctane, kerosene, toluene, and benzene cannot be used exclusively as the reaction media in the dimerization step, since they adversely affect the dimerization reaction of the diolefin and give little or no yield of dimer products.

The ethers used as reaction media should not contain any groups which are distinctly reactive towards sodium. Further, the ether used must not be subject to extensive cleavage under the reaction conditions to yield irreversible reaction products during the dimerization process. Such cleavage action not only destroys the ether but also introduces into the reacting system metallic alkoxides which induce undesirable polymer forming reaction with the diolefins.

Although it is preferred that the reaction medium consist substantially of the ethers as specified, other inert liquid media can be present in limited amounts. In general, these inert media are introduced with the alkali metal dispersion as the liquid in which the sodium is suspended. These inert materials have the principal effect of diluting the ethers. As such dilution increases, a minimum concentration of ether is reached below which the dimerization promoting effect is not evident. It is necessary to maintain the concentration of ether in the reaction mixture at a sufficient level such that it will have a substantial promoting effect upon the diolefin dimerization reaction.

It has also been found highly useful to employ in conjunction with the dimerization reaction one or more techniques of activation for the dimermization process. This can be done in a number of ways and has the effect of increasing the rate of reaction and making the reaction more selective. For instance, a relatively small amount of at least one compound of the polycyclic aromatic class can be included in the reaction mixture. By the term it is intended to include condensed ring hydrocarbons such as naphthalene and phenanthrene, as well as the uncondensed polycyclic compound such as diphenyl, the terphenyls, dinaphthyl, tetraphenyl ethylene and the like. The polyphenyl compounds such as diphenyl, the terphenyls, and their mixtures have been found to be particularly useful. Concentrations in the range of 0.1 to 10 wt. percent based on the amount of diolefins undergoing dimerization are ordinarily quite sufficient.

It has also been found advantageous to carry out the dimerization of the diolefin in the presence of at least one solid friable attrition agent. These activating materials have been found especially valuable for increasing the reaction rate where the dimerization is done in attrition type apparatus such as a ball mill or pebble mill. Friable materials are those which are relatively easily pulverized in this type of apparatus. These materials can further be used either alone or in conjunction with the polycyclic aromatic compounds. Materials which are suitable for use as the solid friable attrition agents include inorganic solids such as alkali metal salts, for example, sodium chloride, sodium sulfate, and potassium sulfate. Also useful is the class of compounds which consists of metallic and non-metallic oxides which are not reactive with metallic sodium under the reaction conditions, for example, sand (silicon dioxide), diatomaceous earth (cellite), zircon, and rutile. Carbon, such as in the form of graphite, can also be used. The material can be utilized in a number of ways. For instance, it can be utilized by the addition to the reaction zone of a suitable attrition agent which has been preground or otherwise adjusted to a satisfactory, useful particle size. On the other hand, a relatively coarse size salt or oxide can be added to a pebble mill or ball mill and, while in contact with the solid alkali metal, the friable attrition agent is ground down to effective size.

It is further highly desirable in the process that the reaction temperature in the dimerization step be held below 0° C. The temperature range between −20° to −50° C. is the preferred one for diolefin dimerization. At higher temperatures, the ether diluents tend to yield cleavage products with the result that sufficient alkoxide by-products are formed to yield high molecular weight polymer products.

In the second step of the reaction, a suitable epoxide compound is added to the dimerized product from the diolefin. This dimerized product is a mixture of dimetallodienes which will react under appropriate conditions with organic compounds containing an epoxide linkage. These epoxide reactants may be varied to yield a wide variety of different types of glycols; for example, epoxides of the aliphatic class such as ethylene oxide, propylene oxide, and the butylene oxides. Aromatic epoxides such as styrene oxide may also be employed. The epoxide derivatives of dienes such as butadiene and isoprene epoxide can also be used.

The reaction of the dimetallic diene compounds with the appropriate epoxide compound is preferably carried out at a temperature below +20° C., preferably in the range of −50 to 0° C.

While proportions of various reactants are not critical, optimum yields of the dimetallic dimer intermediate can be obtained only if the alkali metal, for instance sodium, is present in finely dispersed form and in amounts equivalent to or slightly in excess of the molecular equivalents of diolefin employed. The same relative ratio of reactants is also effective in the reaction of the dimeric derivative with the epoxide, with the restriction that at least two equivalents of epoxide compound are required for each molecule of dimetallic dimer.

In the general practice of the invention, the dimerized derivatives are prepared by reaction of a conjugated diolefin with the alkali metal in a suitable ether solvent, in the presence of a small amount of a polycyclic hydrocarbon and/or in the presence of a selected solid friable attrition agent. The resulting dimetallic diene then is allowed to react with the epoxide compound introduced into the mixture, either in the liquid or vapor state, with or without further dilution with an inert liquid or gaseous diluent. The resultant reaction product then is "quenched" by the gradual addition of water or an alcohol such as methanol or ethanol to liberate the glycols from the sodium alkoxides which are initially formed. The glycols are isolated from this final reaction mixture by extraction, distillation or other suitable means. If a water soluble attrition agent has been used, it can be dissolved away from the more insoluble organic products by water. If the material used is water insoluble, then the separation of the products can readily be accomplished by chemical or physical means.

This reaction may be carried out either in a batchwise or in a continuous manner and it is not intended to limit the process to any particular method of operation.

In the instance where butadiene is the aliphatic diolefin starting material, and the epoxide compound used is ethylene oxide, there results from this method a mixture of $C_{12}$ unsaturated glycols. After hydrogenation, the saturated glycols obtained include 3,6-diethyl-1,8-octanediol and 3-ethyl-1,10-decanediol, which have been identified and both of which are believed to constitute heretofore unknown compositions of matter. The other major component is 1,12-dodecanediol, a known glycol. The glycol products obtained by this particular synthesis constitute a series of compounds in which the two alcohol groups are separated by from 8 to 12 carbon atoms. If some other, higher molecular weight diolefin and/or a different epoxide are employed in the initial reaction, then the structure of the final glycol product will vary accordingly.

The unsaturated glycols or their alkali metal alkoxides or other derivatives can be hydrogenated at the double bonds to yield the corresponding saturated compounds. This also affords a convenient and accurate way to identify the structures of the intermediates as well as the final products.

These glycol products are useful in the synthesis of "drying oil" types of polyesters by esterification with saturated and unsaturated di- and mono-basic acids, and in alkyd resins, and the like. They are also particularly useful for hydrogenation to the corresponding saturated glycols which are quite valuable in the synthesis of polyester plastics and rubbers, plasticizers, synthetic lubricants, polyurethanes, and other products.

The more detailed practice of the invention is illustrated by the following examples, wherein parts are given by weight unless otherwise specified. These examples and embodiments are illustrative only, and the invention is not in any way intended to be limited thereto except as indicated by the appended claims.

*Example I*

Disodioctadiene was prepared from three moles of butadiene and three gram atomic weights of sodium in dimethyl ether reaction medium. The reaction was carried out by initially preparing finely divided sodium dispersion in isooctane and contacting the dispersion in the presence of the dimethyl ether reaction medium with butadiene in the presence of about 1 to 2% of terphenyl. A temperature of about $-23°$ C. was used. The estimated yield of disodiooctadiene from this reaction was about 1.2 moles. When this initial reaction was complete, 3.0 moles of gaseous ethylene oxide were admitted to the mixture over a two-hour period while maintaining a reaction temperature of about $-30°$ C. by refluxing the dimethyl ether. The disodium salts of the resulting $C_{12}$ glycols were treated with methanol and then with water to destroy any unreacted sodium and to liberate the unsaturated glycols from the corresponding sodium alkoxides. The layers were separated and the inert solvents removed from the organic layer. The residual oil was dissolved in ethanol and hydrogenated over a platinum oxide catalyst. Removal of the ethanol and catalyst and distillation at reduced pressure gave about 65% yield of a viscous oil of saturated glycols. This crude material was acetylated with acetic anhydride and a portion of about 50 parts of the resulting $C_{12}$ diacetates subjected to fractional distillation. The following fractions were obtained:

I. 75–180° C./12 mm. (4.5 parts)
II. 181–184° C./12 mm. (5 parts)
III. 190–195° C./12 mm. (25 parts)
IV. Residue (14 parts)

Saponification of fraction II gave a new glycol which has been identified as 3,6-diethyl-1,8-octanediol: B. P. 135–140°/0.5 mm.; $n_D^{25}$ 1.46383; $d_4^{25}$ 0.9175; $MR_D$ calcd. 60.66, found 60.78; percent hydroxyl calcd. 16.80, found 16.92.

Saponification of fraction III gave a second new glycol which has been identified as 3-ethyl-1,10-decanediol: B. P., 127–9°/0.03 mm.; $n_D^{25}$ 1.46293; $d_4^{25}$ 0.9213; $MR_D$ calcd., 60.64, found 60.42; percent hydroxyl calcd. 16.80, found 16.64.

*Analysis.*—Calc. for $C_{12}H_{26}O_2$; C, 71.31; H, 12.87. Found: C, 71.27; H, 12.40.

Saponification of the residue gave a glycol identified as 1,12-dodecanediol: M. P. 79–80° C. (lit. value 80–81° C.); percent hydroxyl, calcd. 16.80, found 16.80.

*Example II*

Disodiooctadiene (0.80 mole) was prepared as described in Example I and was allowed to react with 2.0 moles of propylene oxide at about $-30°$ C. Isolation and hydrogenation of the product as described above in Example I gave the crude saturated glycol mixture. This product was distilled to give 133 parts of a product boiling at 170–180°/0.2 mm. Careful redistillation of about 42 parts of this material gave the following fractions:

I. B. P. 110–112° C./0.02 mm.; 1.2 parts;
II. B. P. 115–120° C./0.02 mm.; 9.8 parts; hydroxyl percent 11.83
III. B. P. 141–145° C./0.02 mm.; 14.8 parts; hydroxyl percent 13.54
IV. B. P. 145–148° C./0.02 mm.; 6.2 parts; hydroxyl percent 13.32

Separation of the individual components was difficult because of closeness of their boiling points and the tendency toward decomposition during distillation. However, fraction II was found to be largely the new glycol, 4,7-diethyl-2,9-decanediol. Fraction III was largely the new glycol, 4-ethyl-2,11-dodecanediol. Fraction IV consisted of another new glycol compound (M. P. 63–65° C.) which is 2,13-tetradecanediol. This is believed to be the structure since it gives a positive iodoform test for the $CH_3$—$C(OH)=$ grouping and melts at a relatively high temperature.

*Example III*

A mixture of disodiodecadienes was prepared from one mole of isoprene and 1.2 gram atomic weights of sodium in diethyl Cellosolve reaction medium substantially as described in Example I. The approximate yield of disodiodecadienes from this reaction was 0.35 mole (70%). When this initial reaction was complete, one mole of ethylene oxide was admitted into the reaction mixture by nitrogen entrainment over a one and one-half hour period. The reaction temperature was maintained at $-30°$ C. during the reaction period. The reaction mixture thickened during the addition of the ethylene oxide and was diluted with dry ethyl ether. The disodium salts of the resulting $C_{14}$ glycols were treated with methanol to destroy unreacted sodium and then with water to liberate the glycols. The oil and water layers were separated. The organic solvents were removed by distillation from the organic layer. The residual oil was dissolved in ethanol and hydrogenated over a nickel catalyst. Removal of the ethanol gave 87.3 parts of crude mixed $C_{14}$ glycols.

Distillation gave the following fractions:

I. B. P. 60–140°/0.02 mm., 12.3 parts
II. B. P. 148–155°/0.02 mm., 56.9 parts
III. B. P. 190–215°/0.02 mm., 8.3 parts Fraction II (50% of theory) was identified as a mixture of $C_{14}$ glycols; hydroxyl percent 14.1 (theoretical 14.80); $d_4^{25}$ 0.9189; $n_D^{25}$ 1.4683; $MR_D$ calcd. 69.84; found 69.37.

No single component could be isolated and identified from this mixture by ordinary laboratory physical and/or chemical means because of the number of isomers present and the closeness of their boiling points. On the basis of the syntheses employed, the following compounds are present:

4,9-dimethyl-1,12-dodecanediol
5,8-dimethyl-1,12-dodecanediol
4,8-dimethyl-1,12-dodecanediol
3-isopropyl-7-methyl-1,10-decanediol
3-isopropyl-6-methyl-1,10-decanediol

What is claimed is:

1. The method of preparing a mixture of unsaturated glycols in which the hydroxyl groups are separated by at least 8 carbon atoms, which comprises dimerizing a conjugated aliphatic diolefin at a temperature below about 0° C. in the presence of a finely divided alkali metal selected from the group consisting of sodium and potassium and in the presence of an ether diluent selected from the group consisting of an aliphatic mono ether having a methoxy group and in which the ratio of the number of oxygen atoms to the number of carbon atoms is not less than 1:4 and acyclic and cyclic polyethers which are derived by replacing all of the hydroxyl hydrogen atoms of the polyhydric alcohol by alkyl groups and a polycyclic aromatic hydrocarbon dimerization activator, reacting the organometallic diene product thus formed, unseparated from the reaction mixture, with an epoxide to form the salts of the corresponding unsaturated glycols, and hydrolyzing the salts of the unsaturated glycols so obtained.

2. The method of claim 1 wherein the epoxide is ethylene oxide.

3. The method of claim 1 wherein the epoxide is propylene oxide.

4. The method of claim 1 wherein the diolefin is butadiene.

5. The method of claim 1 wherein the diolefin is isoprene.

6. The method of claim 1 wherein the alkali metal is sodium.

7. The method of claim 1 which comprises reacting butadiene, sodium, and ethylene oxide.

8. The method of preparing saturated glycols in which the hydroxyl groups are separated by at least 8 carbon atoms, which comprises dimerizing a conjugated aliphatic diolefin at a temperature below about 0° C. in the presence of a finely divided alkali metal selected from the group consisting of sodium and potassium and in the presence of an ether diluent selected from the group consisting of an aliphatic mono ether having a methoxy group and in which the ratio of the number of oxygen atoms to the number of carbon atoms is not less than 1:4 and acyclic and cyclic polyethers which are derived by replacing all of the hydroxyl hydrogen atoms of the polyhydric alcohol by alkyl groups, and a polycyclic aromatic hydrocarbon dimerization activator, reacting the organometallic diene product thus formed, unseparated from the reaction mixture, with an epoxide to form the salts of the corresponding unsaturated glycols, hydrolyzing the salts of the unsaturated glycols so obtained, and hydrogenating said unsaturated glycols to the corresponding saturated glycols.

9. The method of claim 8 wherein the diolefin is butadiene.

10. The method of claim 8 wherein the alkali metal is sodium.

11. The method of claim 8 wherein the epoxide is ethylene oxide.

12. The method of preparing a mixture of unsaturated glycols in which the hydroxyl groups are separated by at least eight carbon atoms which comprises dimerizing a conjugated aliphatic diolefin at a temperature below about 0° C. in the presence of a small amount of a polycyclic aromatic hydrocarbon and an ether diluent selected from the group consisting of an aliphatic mono ether having a methoxy group and in which the ratio of the number of oxygen atoms to the number of carbon atoms is not less than 1:4 and acyclic and cyclic polyethers which are derived by replacing all of the hydroxyl hydrogen atoms of the polyhydric alcohol by alkyl groups, with finely divided sodium, immediately thereafter reacting the organometallic diene product thus formed with an epoxide to form the salts of the corresponding unsaturated glycols, and hydrolyzing the salts of the unsaturated glycols so obtained.

13. The method of claim 12 wherein the epoxide compound is ethylene oxide.

14. The method of preparing a mixture of unsaturated glycols in which the hydroxyl groups are separated by at least eight carbon atoms which comprises dimerizing a conjugated aliphatic diolefin at a temperature below about 0° C. in the presence of a small amount of a solid friable attrition agent and an ether diluent selected from the group consisting of an aliphatic mono ether having a methoxy group and in which the ratio of the number of oxygen atoms to the number of carbon atoms is not less than 1:4 and acyclic and cyclic polyethers which are derived by replacing all of the hydroxyl hydrogen atoms of the polyhydric alcohol by alkyl groups, with finely divided sodium, immediately thereafter reacting the organometallic diene product thus formed with an epoxide to form the salts of the corresponding unsaturated glycols, and hydrolyzing the salts of the unsaturated glycols so obtained.

15. The method of claim 14 wherein the epoxide is ethylene oxide.

References Cited in the file of this patent

UNITED STATES PATENTS

| Number | Name | Date |
| --- | --- | --- |
| 2,106,182 | Kreimeier | Jan. 25, 1938 |
| 2,125,384 | Macallum | Aug. 2, 1938 |
| 2,171,867 | Scott et al. | Sept. 5, 1939 |
| 2,352,461 | Walker | June 27, 1944 |
| 2,669,579 | Urban | Feb. 16, 1954 |

OTHER REFERENCES

Beilstein: Handbuch der Organischen Chemie, 1918, vol. I, page 502.

Fieser et al.: Organic Chemistry, 1950, second edition, page 335.

McClellan: Ind. Eng. Chem., vol. 42 (1950), pp. 2402–7.

Gilman: "Organic Chemistry," vol. 1 (2nd edit.), Wiley & Sons, N. Y., 1953; pp. 524–7.